April 21, 1931. M. BAKER 1,802,306
FROZEN CONFECTION
Filed Aug. 19, 1930  2 Sheets-Sheet 1

Inventor.
Max Baker.
By E. W. Bond
Attorney.

April 21, 1931.  M. BAKER  1,802,306
FROZEN CONFECTION
Filed Aug. 19, 1930   2 Sheets-Sheet 2

Inventor,
Max Baker
By E. W. Hood
Attorney.

Patented Apr. 21, 1931

1,802,306

UNITED STATES PATENT OFFICE

MAX BAKER, OF WASHINGTON, DISTRICT OF COLUMBIA

FROZEN CONFECTION

Application filed August 19, 1930. Serial No. 476,386.

This invention relates to frozen confections and it has for its objects among others to provide a confection comprising an edible container or frame of spongy texture and a center or filling of solid ice-cream or analogous substance bonded thereto.

The invention also pertains to a method whereby such frozen confection with a container to which it is bonded may be produced.

The invention will be fully understood from the following descriptions read in conjunction with the drawings, in which Fig. 1 is a top view of a preferred embodiment of my invention.

Figure 1:
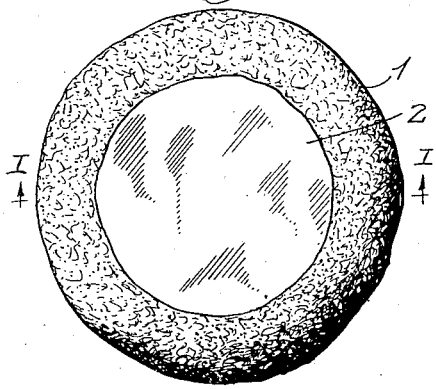

Confections composed of ice cream and bakery products have been heretofore vended, and such articles ordinarily take the form of sheets or receptacles of oven baked material characterized by a fair degree of strength and in which the ice cream is largely supported by the baked material. Such confections, for example, take the form of cones or pockets containing ice cream, or flat sheets enclosing a layer of ice cream to form the conventional sandwich. While cake of spongy texture forms a particularly attractive combination with ice cream, it is not adapted to use in this manner due to its relative lack of strength and tendency to become soft and porous in contact with soft or semi-fluid cream. With the forms known in the prior art moreover, the consumer, during at least the major part of consumption, is not permitted to select for mastication alternatively the ice cream or bakery product but is virtually compelled to bite off a portion containing both.

I have found it to be a further desideratum to provide a frozen confection which although vended as a unitary article permits the consumer at all times to exercise absolute choice of selection as to the relative portions of ice cream and bakery products he wishes at any time to taste.

In an effort to provide the desiderata hereinabove enumerated, and to render feasible the vending of a unitary article comprising ice cream together with cake of a spongy mixture, I have found it advisable to form the cake into a frame defining a central opening which central opening is several times the maximum dimension of the cake within the frame at any point. By reference to the frame, I wish to connote an encircling portion of round, square or alternative cross-section having neither top nor bottom and therefore defining a complete unobstructed central opening. The word "frame" will be hereinafter used in the specification and claims to denote a construction of this sort. Within the central opening so defined I incorporate a centre of solid frozen ice cream. The plane surfaces of the ice cream centre are not supported in any way, but the ice cream centre is supported solely by virtue of its adhesion to the frame of cake. By concentrating the cake in the form of a frame as aforesaid, the relatively weak material of which it is composed is capable of carrying all of the strains incidental to use, and while grasped in the hand has sufficient thickness to act as an effective insulator. The plane surfaces of the ice cream centre are entirely unsupported; this is essential in order to permit the customer to freely select which portion of the article he wishes to bite at any time, and I have overcome the difficulty of supporting the ice cream centre by causing the ice cream to bond or cement itself to the surrounding cake frame. In making the cake frame of spongy texture the surface thereof is ordinarily somewhat roughened, particularly where a central mold has been employed and withdrawn. In order to effect the bond or adhesion between the frame and centre, I introduce the ice cream in fluid or semi-fluid condition at least adjacent to the frame, the degree of fluidity being sufficient to permit the ice cream to penetrate and fill the irregularities in the contiguous surface of the cake frame, and thereafter freeze the two to entirely solidify the ice cream centre and produce a unitary article of the type described. The cake further acts as an insulator during consumption to prevent too rapid thawing of the portions of the ice cream which are bonded to the cake, thereby adequately supporting the entire centre of ice cream until fully consumed.

I find it a further improvement to supercool the ice cream centre to such a point that it has a relatively brittle character. This may be accomplished by super-cooling it to a degree until the brittle character is produced. This will be apparent by the fact that when bitten the centre will develop a conchoidal fracture in contrast to the soft and yielding fracture of ice cream close to the melting point. While the temperature to which the centre should be supercooled will vary with the composition of the cream, in general I may state that it should be supercooled to a temperature not above 15° F.

Referring now to Figs. 1 to 4, the preferred form of confection is shown in Fig. 1 in which the same appears in top view and in which the annulus of cake of spongy texture is indicated by 1 and the centre of solid ice cream is indicated by 2. The same appears in side view in Fig. 2 and in vertical section in Fig. 3. As will be apparent from Fig. 3, the cake has a spongy cellular texture and the ice cream penetrates and fills the irregularities on the mating surface of the frame 1 so that when frozen solid it is in fact integral therewith and cemented thereto.

Figure 2:
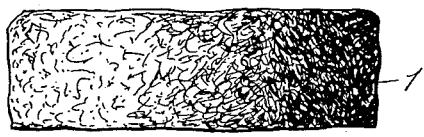
Fig. 2 is a side view of the confection shown in Fig. 1.
Figure 3:
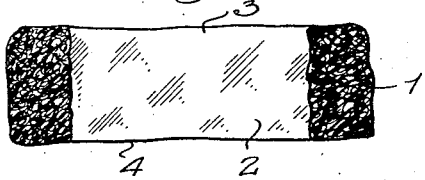
Fig. 3 is a section through Fig. 1 on the plane denoted by I—I.
Figure 4:
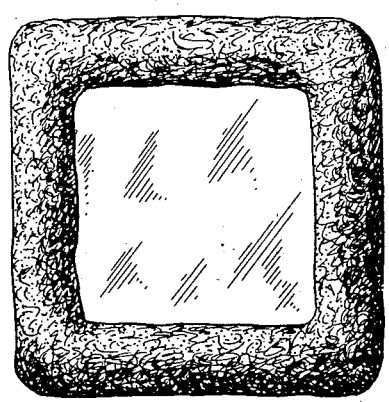
Fig. 4 is a top view of an alternative form of my invention.

While the form shown in Figs. 1 to 3 has a frame of annular form, I do not wish to be limited thereto; I may, for example, employ a frame of any suitable form defining an unobstructed central opening, viz., an opening having neither top nor bottom. I have illustrated one such form, of rectangular outline in Fig. 4. The side view and vertical section through the same will be identical with that appearing in Figs. 2 and 3, respectively. As illustrated, the diameter of the central opening is preferably at least about three times the maximum horizontal or vertical dimension through the surrounding frame, and the ice cream centre has two plane surfaces 3 and 4 which are not covered and are supported only by the adhesion of the centre 2 to the frame 1.

In making the cake, I have found that certain precautions must be exercised. For example, unless care is exercised in choosing and compounding the ingredients, the cake will tend to crack or crumble in freezing or will be so hard when frozen as to be difficult to bite. I have, however, by suitable precautions produced a confection comprising a frozen cake which is characterized by substantially uniform softness throughout the entire range from 20° F. up to normal temperatures. Among other things, in order to produce such a cake, I have found it to be rigorously necessary to exclude water from the mix and to work only with solvents in which the water present is in a thoroughly colloidal state. Such a cake formula for example, may be made with the following ingredients:

1 pound sugar, 1 pound eggs, 1 pound flour, ½ pound butter, 1 ounce salt, ½ ounce baking powder, vanilla flavor.

Figure 5:
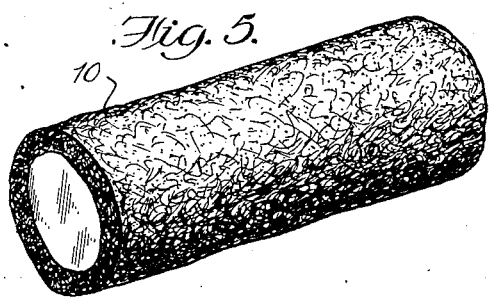
Fig. 5 is a perspective view of a cake form which may be utilized as an intermediate in the manufacture of my confection.
Figure 6:
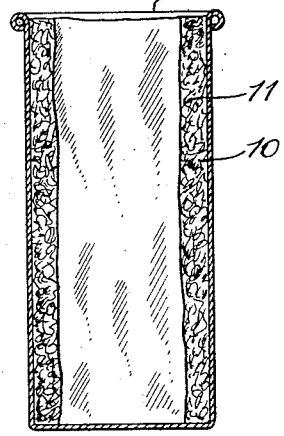
Fig. 6 is a vertical section through the construction shown in Fig. 5 enclosed in a suitable mold for the purpose of forming therein the central portion of solid ice cream.
Figure 7:
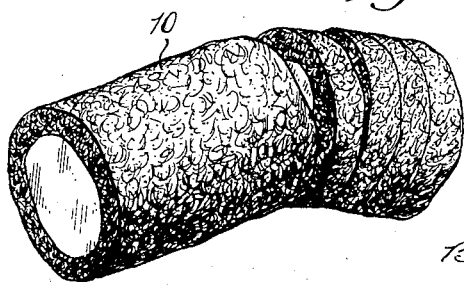
Fig. 7 is a perspective view of the cake form shown in Fig. 5 in process of forming the finished confection therefrom.

In compounding the batter, the eggs are whipped with the sugar while warm until they become fairly stiff, the flavoring is then added. The baking powder and flour are then slowly added in order not to destroy the liquid-air emulsion produced by whipping. The butter is then added in fluid condition. As an intermediate in the manufacture of the frame, I may, for example, make a tubular form 10 such as illustrated in perspective in Fig. 5. Such a form may be baked in a suitable mold which need not be more fully described inasmuch as such molds can be constructed pursuant to the directions of a competent baker. When such a tubular form 10 has been baked and finished, it may be separated from the baking mold and transferred to a pan or receptacle 11 shown in vertical section in Fig. 6. The said pan need not be more fully described inasmuch as every cross-section through it is of circular form. After transferring the tubular cake form 10 to the mold 11, the interior space 12 is filled with ice cream. This is preferably in a semi-fluid condition so that it can penetrate into the irregularities of the interior surface of the cake 10, but is preferably not entirely fluid as this would result in causing the cake to become soggy. After filling the centre portion 12 with ice cream the mold 11 is transferred to a refrigerator kept well below the freezing point of the cream, say for example at a temperature below 20° F., until the ice cream centre 13 has become entirely frozen and solidified. The contents are then extracted and sliced into individual finished confections by cutting along the lines indicated in perspective view in Fig. 7.

Owing to the difficulty of cutting the ice cream centre when frozen to brittle condition, it is then desirable to return the individual confections to the refrigerator and supercool them until the ice cream centres have entered the brittle range, and thereafter to wrap and vend the confections while holding the same below this temperature, say for example below 15° F.

Figure 8:
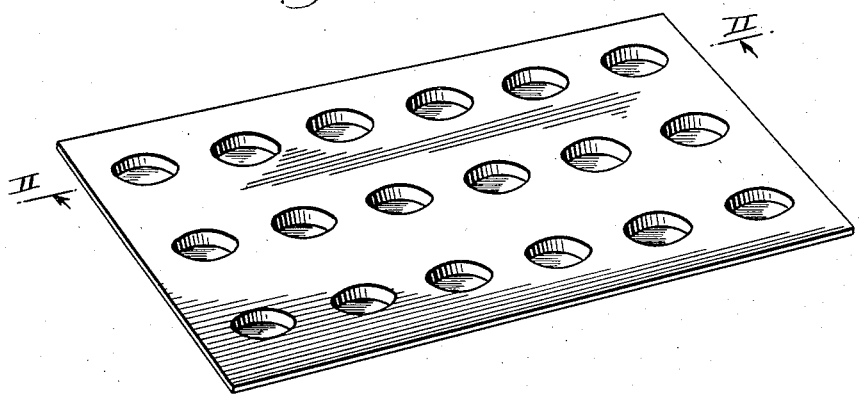
Fig. 8 is a perspective view of a mold which I may employ in making solid ice cream centres for the said confection.
Figure 9:
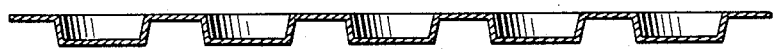
Fig. 9 is a vertical sectional view of the construction shown in Fig. 8 on the plane denoted by II—II.
Figure 13:
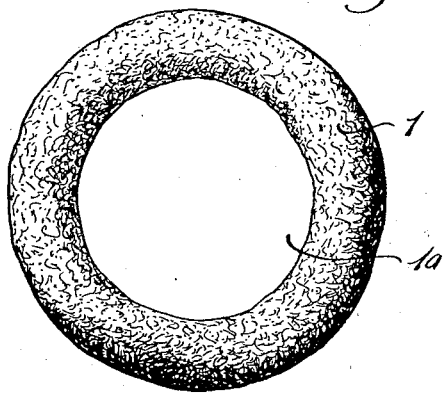
Fig. 13 is a plan view of the finished product shown in Fig. 12.
Figure 11:
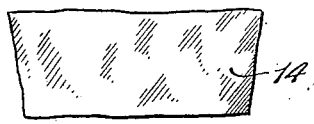
Fig. 11 is a section through the construction shown in Fig. 10 on the plane denoted by III—III.
Figure 10:
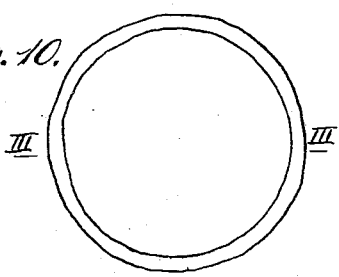
Fig. 10 is a bottom view of the molded ice cream centres produced by the mold shown in Figs. 8 and 9.

There are some disadvantages in this procedure, and for that reason I prefer a modified procedure in accordance with which I first form the tube 10 of cake of spongy texture and thereafter cut this into individual segments of annular form, one of which is shown in top view in Fig. 13, such forms comprising the annulus 1, defining the central unobstructed opening 1ª. The interior surface of the opening 1ª is ordinarily somewhat rough and irregular as previously described. I then separately freeze the centre pieces of cream by the use of a mold such as that shown in perspective in Fig. 8 and in vertical section in Fig. 9. This is accomplished by filling the pans 12 in the mold 13 (Fig. 8) with ice cream in fluid or semi-fluid condition, thereafter transferring the mold and contents to a refrigerator until fully frozen and then ejecting the ice cream centres 14 by inverting the mold and warming the same. As illustrated in Fig. 11, the centres so formed are preferably of tapered form, and the smaller diameter thereof is slightly less than the diameter of the central opening 1ª while the larger diameter is slightly greater.

Figure 12:
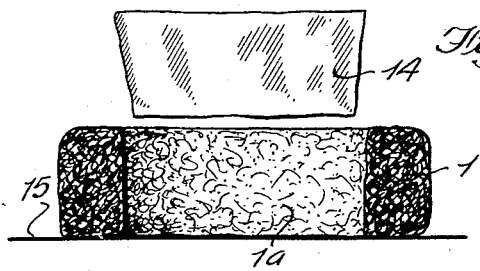
Fig. 12 is a sectional view illustrating the mode of insertion of one of said centres into a frame in process of forming said confection.

In forming the finished confection, the cake annulus 1 is laid on a plate and the tapered centre pieces are inserted, small end first, as indicated in Fig. 12. This may, for example, be manually accomplished. After the centres have been inserted the frame 1 and the centre 14 are kept in a room which is above the freezing point of the cream for a few minutes until the portions of the cream centre contiguous to the frame 1 have melted or softened, and this together with the fact that the centre 14 is of slightly greater diameter than the cake frame 1, will cause the two to conform and the ice cream to penetrate and fill the irregularities of the interior roughened surface of the frame 1. The melting should preferably not proceed further and should be only superficial. If it is so limited when the supporting plate 15 and the confections laying thereon are returned to the refrigerator, they will be easily and promptly frozen to the desired condition in a very short time. After they have been frozen to the desired temperature, say for example below 15° F., they may be wrapped and marketed. Suitable precautions should of course be maintained to hold them below this temperature until delivered to the ultimate consumer.

The foregoing description is only for purposes of illustration and is not intended by way of limitation. It is my intention that the invention be limited only by the appended claims or their equivalents in which I have endeavored to claim broadly all inherent novelty.

Where in the foregoing description, I have referred to the term "bonding" I do not intend to mean mere adhesion, as I am aware that viscid adhesion is an inherent property in all fluids and semi-fluids. By "bonding" I mean where a bond is effected when a portion of the semi-fluid cream is absorbed into the body of the cake frame and subsequently frozen into the cell structure.

I claim:

1. A frozen confection comprising a cake frame of spongy texture, defining a central opening through said frame, and having a rough interior surface, a centre of frozen ice cream bonded thereto, and supercooled to a brittle condition.

2. A frozen confection comprising a cake frame of spongy texture, defining a central opening through said frame, and having a rough interior surface, a centre of solid ice cream bonded thereto, and supercooled to a temperature of not exceeding 15° F.

3. A frozen confection comprising an annulus of cake of spongy texture, having a rough interior surface, and a centre of solid ice cream cast in conformity with said interior surface and supported by bonding thereto.

4. A frozen confection comprising an annulus of cake of spongy texture having an opening therethrough and having a rough interior surface, a centre of solid ice cream bonded thereto, and supercooled to a brittle condition.

5. Method of making a frozen confection comprising forming a cake frame of spongy texture, defining a central opening with a rough interior surface surrounding said opening, introducing ice cream to said opening, causing a part of said ice cream to flow into and conform to the irregularities in said interior surface, and thereafter bonding said frame and said ice cream by freezing and solidifying the said introduced ice cream.

6. Method of making a frozen confection comprising forming a cake frame of spongy texture, defining a central opening, and having a rough interior surface, inserting in said opening a preformed inlay of solid ice cream, causing said inlay to melt superficially and to conform to the irregularities in said rough interior surface, and thereafter freezing said inlay to bond the same to said frame.

7. Method of making a frozen confection, which comprises forming a cake frame of spongy texture, defining a central opening, and having a rough interior surface, inserting in said opening a preformed inlay of solid ice cream of tapered form with a maximum diameter slightly in excess of the diameter of said opening, causing said inlay to melt superficially and to conform to the irregularities in said rough interior surface, and thereafter freezing said inlay to bond the same with said frame.

8. Method of making a frozen confection, which comprises forming an annulus of cake of spongy texture with a rough interior surface, inserting in the opening defined by said annulus a preformed inlay of solid ice cream, said inlay having a greater maximum diameter than the diameter of said opening, causing said inlay to melt superficially and to conform to the irregularities in said rough interior surface, and thereafter freezing said inlay to bond the same with said frame.

In testimony whereof I affix my signature.

MAX BAKER.